July 15, 1952     H. P. BIRKEMEIER     2,603,231
PRESSURE RELIEF VALVE

Filed Feb. 27, 1946     3 Sheets-Sheet 1

Inventor:
Henry P. Birkemeier
By. [signature]
Attorney.

July 15, 1952 H. P. BIRKEMEIER 2,603,231
PRESSURE RELIEF VALVE
Filed Feb. 27, 1946 3 Sheets-Sheet 2

Inventor:-
Henry P. Birkemeier.
By
Attorney.

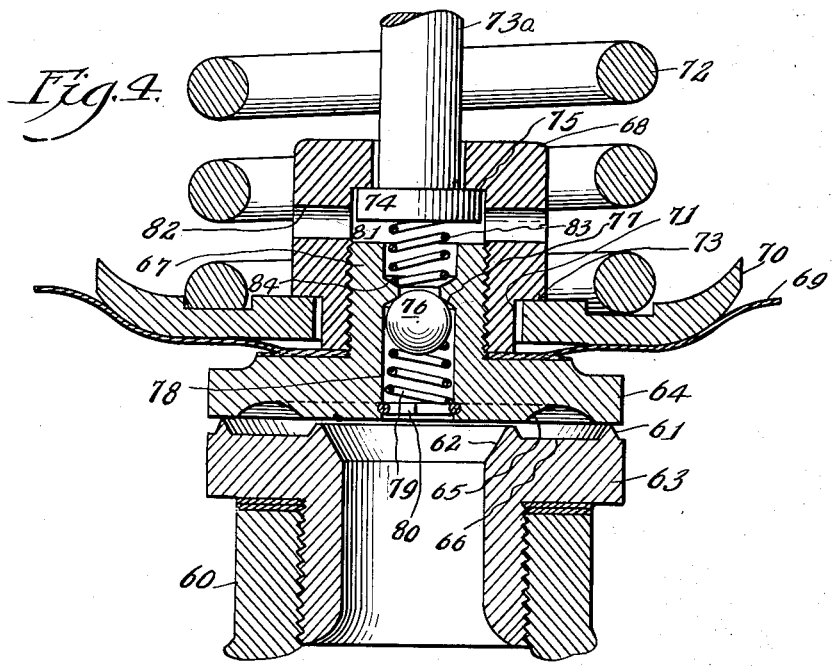
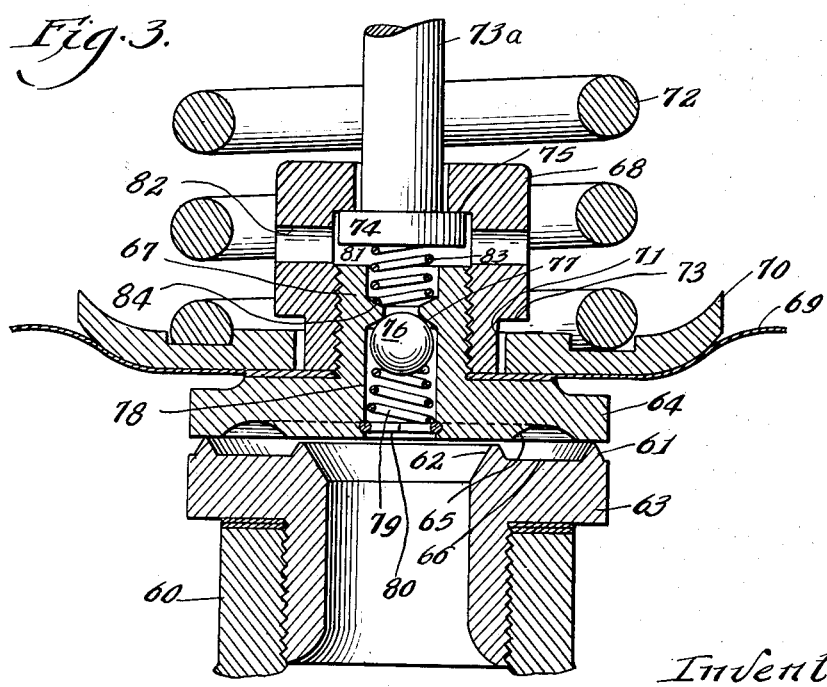

Patented July 15, 1952

2,603,231

UNITED STATES PATENT OFFICE 2,603,231

PRESSURE RELIEF VALVE

Henry P. Birkemeier, Chicago, Ill., assignor to Bell & Gossett Company, Morton Grove, Ill., a corporation of Illinois Application February 27, 1946, Serial No. 650,649

5 Claims. (Cl. 137—218)

My invention relates to pressure relief valves for devices containing fluid under pressure, specific examples of such devices being hot water boilers and hot water heating systems, and more particularly to a valve of this type which is characterized by a capacity for substantially relieving the device within relatively small pressure limits.

A characteristic use of such valves is in connection with domestic hot water heating systems in which they are usually attached to the boiler and the present invention will be described in this environment. Customarily, relieving control by a device of this type is exercised by a valve carried by a spring loaded diaphragm that is responsive to boiler pressure and is normally adjusted to open the valve at a pressure in excess of thirty pounds gage. As the boiler pressure rises above the set pressure of the valve, the latter opens slightly but only partially relieves the boiler since, at the initial opening pressure, the valve has a relatively small capacity. The valve may then close, followed by successive openings and closings. In any case, it is well known that the relief afforded by these valves, as presently constructed, does not become sufficient until the valve has been opened by a boiler pressure well above the setting of the valve, and particularly a pressure that is considered unsafe for operation. Such pressures may be of the order of ten pounds or more above the setting of the valve. The repeated attainments of such pressures by reason of inadequate relief produces racking strains in and may rupture the boiler.

It is therefore one object of my invention to provide a pressure relief valve which is constructed and arranged with sufficient capacity to rapidly and noiselessly relieve the boiler at a pressure well below that considered unsafe and to accomplish this result within relatively small pressure limits.

A further object is to provide a valve as indicated which is characterized by a quick opening or snap action, and in which provision is made for preventing siphonage that sets up vibration and excessive noise.

A further object is to provide a pressure relief valve which is arranged to discharge a minimum quantity of water during the initial heating period if the expansion of water in the system develops a pressure sufficient to open the valve.

These and further objects of my invention will be set forth in the following specification, reference being had to the accompanying drawings, and the novel means by which said objects are effectuated will be definitely pointed out in the claims.

In the drawings:

Figs. 3, 4 and 5 are enlarged fragmentary, sectional views of a modified form of the valve in which the valve is characterized by a delayed, snap action, the figures corresponding to fully closed, intermediate and fully opened positions of the valve, respectively.

Figure 1:
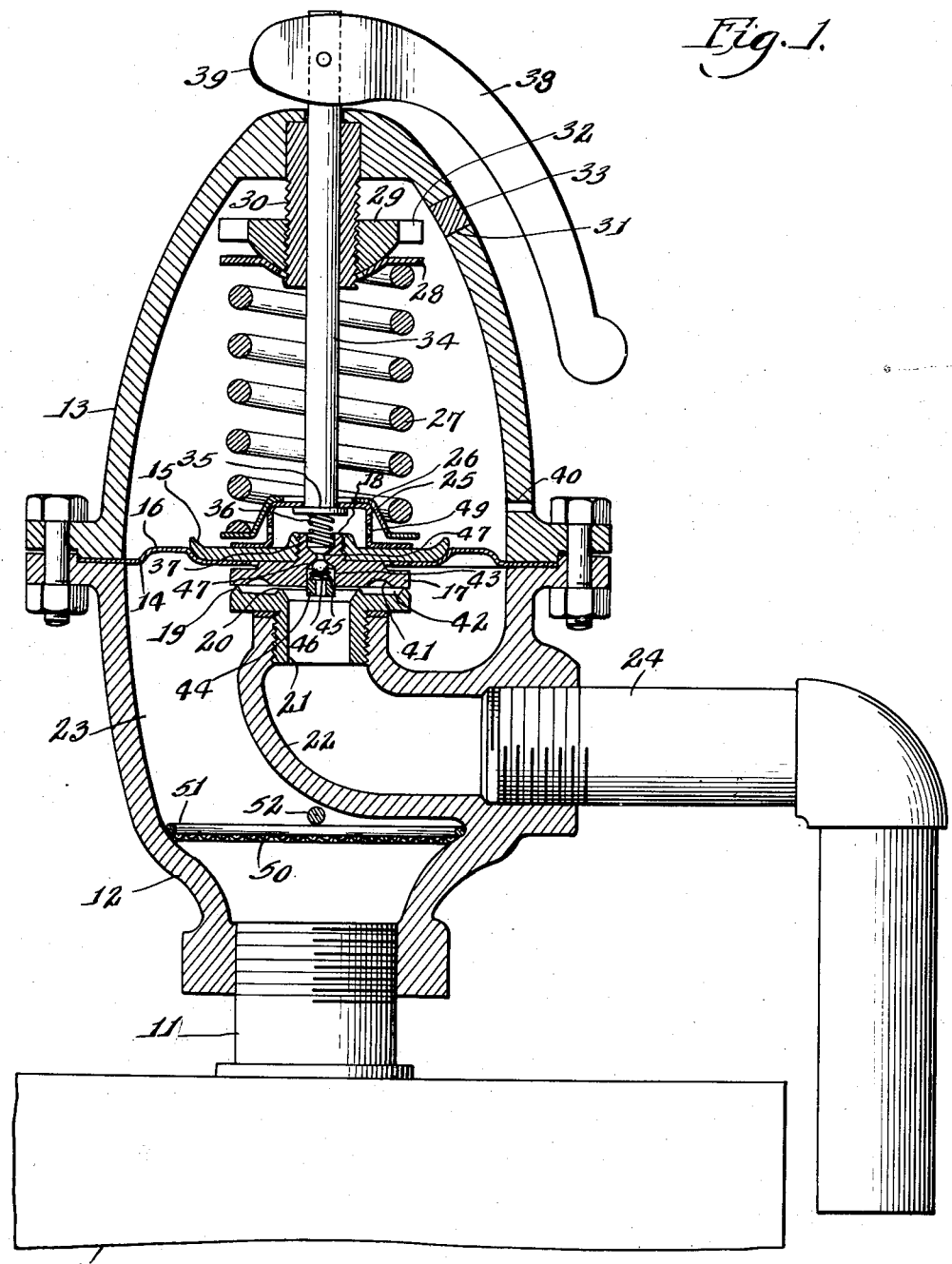
Fig. 1 is a sectional elevation of one form of my improved valve shown in operative relation to a hot water boiler.

Referring to the drawings and more particularly Fig. 1 thereof, the numeral 10 designates a hot water boiler such as may, for example, form part of a hot water heating system. From the upper part of the boiler extends a nipple 11 whose upper end is threaded in the body 12 of the relief valve which has attached thereto a cover 13. However, the valve may be secured to other parts of the boiler, or to any part of the heating system. The peripheral portion of a diaphragm 14 is clamped between the body 12 and cover 13 while its inner portion is secured to a plate 15. The free part of the diaphragm 14 between the plate 15 and the clamped portion thereof is preferably formed with an upward, annular bulge 16 to provide adequate stroke and hinging action with resulting improved flexibility. A valve disk 17 is secured to the under side of the plate 15 by means of a connector 18 threaded upwardly through and coaxial with the plate. The bottom surface of the disk 17 normally engages an annular valve seat 19 to provide a primary seal and in concentric relation to and disposed inwardly of the seat 19 is a shoulder ring 20 whose upper surface is preferably spaced slightly from the disk 17, the spacing being only that necessary to insure seating of the disk on the seat 19. This seat may be of the knife edge type and it and the ring 20 are formed on the shouldered end of a bushing 21 that is threaded in the inlet end of a discharge passage 22 extending from a side wall of the body 12 within a chamber 23 below the diaphragm 14. However, the seat 19 and ring 20 may be formed on the disk 17, if desired, and in that event, the top surface of the flanged portion of the bushing 21 would be flat. One end of a drain pipe 24 is connected to the outlet of the passage 22.

An inverted cup 25 is secured to the upper side of the plate 15 and resting thereon is a lower spring seat 26 that is engaged by the lower end of a helical, compression spring 27 whose upper end bears against an upper spring seat 28. The seat 28 is carried by an adjusting nut 29 threaded on a bushing 30 that is seated in the upper part of the cover 13 and by this arrangement, it is possible to load the spring 27 as desired and hence determine the pressure in the chamber 23 which will lift the diaphragm 14 and open the valve disk 17. When the valve is first assembled, the cover 13 includes an aperture 31 through which a tool (not shown) can be inserted to engage the walls of a selected notch 32 on the nut 29 and thus adjust the nut to compress the spring 27. After the desired compression has been secured, the aperture 31 is filled with a permanent plug 33 which prevents subsequent surreptitious tinkering with the correct adjustment.

Occasionally, it may be desirable to manually open the valve disk 17 and for this purpose, a stem 34 is slidably mounted through the bushing 30 and is provided on its lower end with a head 35 which has lifting engagement with the cup 25, the head being normally maintained in contact with the cup by a spring 36 seated in a pocket 37 in the connector 18. The upper end of the stem 34 extends above the cover 13 for pivotal securement to a handle 38 having at the pivoted end thereof a cam nose 39 which, when the handle is rocked counterclockwise, rides on the top of the cover and effects a lifting of the stem 34 and hence an opening of the valve disk 14.

Under operating conditions and assuming that the valve disk 17 occupies the closed position shown in the drawing, pressure in the chamber 23 is effective against substantially only that portion of the diaphragm 14 which lies outwardly of the periphery of the disk 17 so far as an opening movement of the disk is concerned. When the total pressure acting against the diaphragm exceeds the spring loading, the diaphragm lifts and separates the valve disk 17 from contact with the valve seat 19. Possible compression of the air in the cover 13 above the diaphragm is prevented by an aperture 40 in the cover. Since the annular gap between the seat 19 and the disk 17 is larger in area than the annular gap between the ring 20 and the disk by reason of the differences in diameters of the seat and ring, it will be obvious that the last noted gap exercises a throttling action on the escape of water and pressure from the chamber 23. This action provides a time factor which enables the pressure in the chamber 23 to act against the added area represented by that portion of the under side of the disk 17 between the valve seat 19 and ring 20 and therefore rapidly increases the lifting movement of the diaphragm. Accordingly, the valve is characterized by substantially a snap action which results in a quick and material relief of the boiler pressure. In some instances and depending upon the temperature of the boiler water at the relieving pressure, the water may flash into steam after passing the valve seat 19. Because the valve opens to provide a quick, substantial relief, it also closes quickly and will maintain pressures within approximately three pounds or less of the diaphragm loading, each being per square inch.

In order to improve the operating characteristics of the device, the disk 17 is provided with an annular groove 41 which faces and registers with an annular depression 42 on the bushing 21 between the seat 19 and ring 20. This arrangement provides space for any water that may be trapped between the disk 17 and bushing 21 during the closing movement of the disk and facilitates snap action of the disk in a closing direction. If this space were not provided, closure of the disk would be delayed due to the incompressibility of water until the trapped water was discharged past the ring 20.

Comparative tests made between my improved valve employing the double seat arrangement and four well known, standard types of pressure relief valves, each having the characteristic single valve seat, clearly demonstrates the superior relieving capacity of the valve disclosed herein. For example, at a pressure of thirty pounds per square inch, the discharging capacity of the indicated prior art valves ranges from approximately 3/4 to 4 1/4 gallons per minute, while the discharge of my improved valve is of the order of 11 3/4 gallons per minute. Comparable discharges are effected at higher and lower pressures.

A further advantage of the valve, compared to other types of snap action valves, resides in its ability to discharge a minimum quantity of water when the boiler is fired after a filling of the system. If the water expands sufficiently to develop a pressure that will open the valve, the water flow is so slow due to the slow rise of pressure that no substantial pressure is built up between the valve seat 19 and ring 20 and the valve therefore discharges only a trickle of water. In most cases, this small discharge is sufficient to relieve the boiler under the conditions stated and this characteristic is in marked contrast to existing snap action valves which are capable of only a single mode of action and hence discharge more water from the system during a slow pressure rise than circumstances require. This excessive water loss must be replenished.

The operation of snap opening valves may be effected by a siphon action on their discharge sides which, in the present instance, may arise when the valve disk 17 opens. The first rush of water will fill the discharge passage 22 and piping 24 and water passing therethrough will acquire a definite velocity. Because of the release in pressure in the boiler, a slight drop of the diaphragm actuating pressure takes place which results in a small closing movement of the disk 17, thus reducing to some extent the discharging flow of water. However, the velocity of the water in discharge pipe 24 sets up a partial vacuum on the discharge side of disk 17 which tends to further close the disk. This action occurs intermittently and at a rapid rate and may set up a severe vibration in the connected piping.

To prevent the foregoing in my improved valve, means are provided to instantaneously break any siphonage. Specifically, these means include a valve chamber 43 in the disk 17 which opens downwardly towards the passage 22 and in whose lower end is threaded a bushing 44 so that the chamber 43 is always in communication with the passage 22. The lower end of a helical spring 45 rests on the upper end of the bushing 44 and normally urges a ball valve 46 into contact with a seat 47 at the upper end of the chamber 43, thus closing a passage 48 which provides communication between the pocket 37 and the chamber 43. Apertures 49 are provided in the side wall of the cup 25 so that the interior of the cup is always at atmospheric pressure. Hence, if a siphonic condition is initiated in the passage 22, the ball valve 46 is immediately unseated by the outside air pressure and the partial vacuum in the passage 22 is destroyed. Therefore, when once opened and so long as the boiler pressure remains adequate the valve discharges water continuously and without vibration.

A screen 50 is located in the lower part of the body 12 adjacent the connection of the nipple 11 therewith to prevent foreign particles from reaching the valve seat. This screen is held in position by a spring ring 51 which contacts the wall of the body 12 in coterminous relation to the screen and is disposed below a pair of opposed bosses 52, only one of which is illustrated, that extent inwardly from the wall of the body. If the screen should become clogged, boiler relief is effected by the ring and screen bowing and permitting flow past the edges of the screen.

Figure 2:
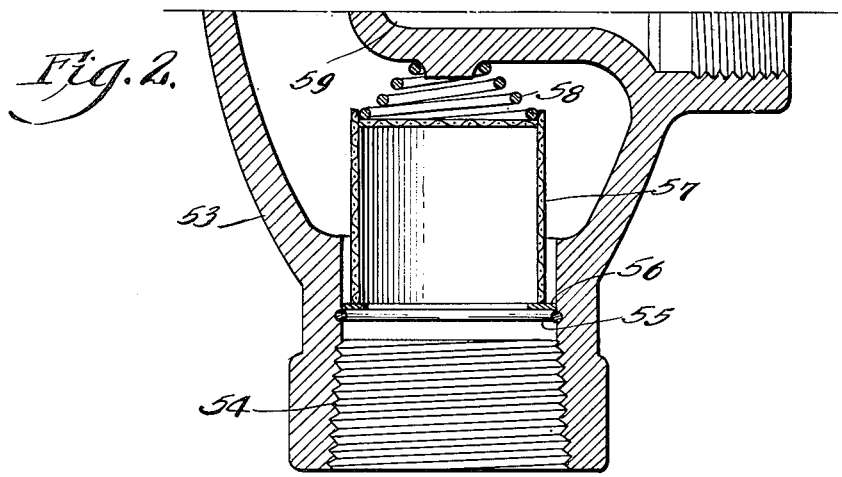
Fig. 2 is a sectional detail showing a modified screen arrangement for use with the valve illustrated in Fig. 1.
Figure 5:
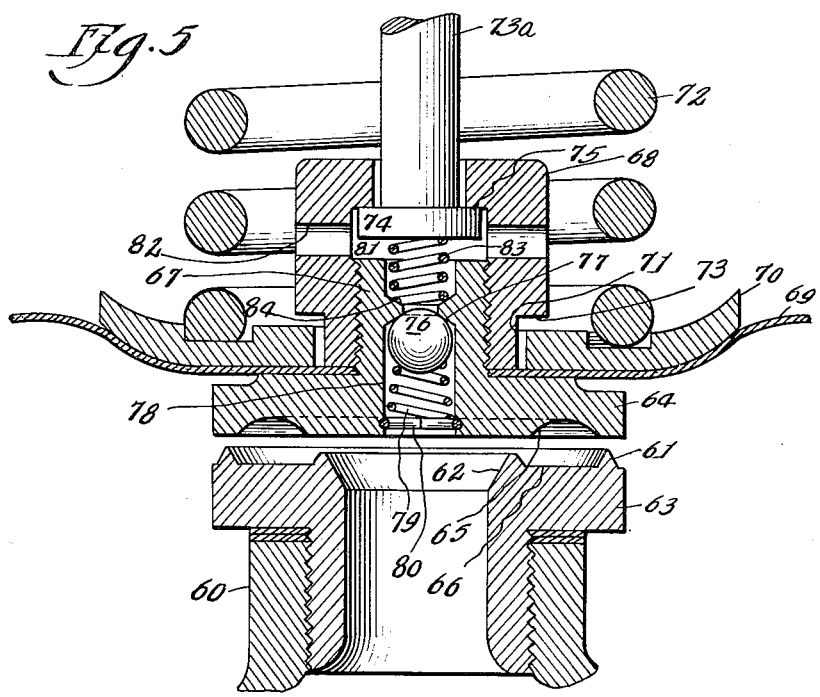

In Fig. 2 is illustrated a modified screen arrangement wherein the numeral 53 designates a valve body similar to the body 12 having an inlet passage 54 whose lower portion is threaded for receiving a nipple or pipe (not shown) as a connection with the boiler. A split, spring ring 55 seats in the inner wall of the passage 54 above the threaded portion thereof and resting on the ring is a washer 56 whose outer diameter is less than the threaded diameter of the passage 54 so that the washer may be easily removed. Secured to and extending upwardly from the washer 56 is an inverted, screen cup 57 and a spring 58 interposed between the top of the cup and the wall of a discharge passage 59, corresponding to the passage 22, normally maintains the washer in contact with the ring 55 and the cup in its normal screening position. In the event of clogging, the cup merely lifts against the spring to relieve the boiler. This construction possesses the advantage of accessibility in that the screen can be readily removed for cleaning without disassembling the body and cover of the valve.

A modified snap acting valve is illustrated in Fig. 3, the body and cover of the valve being omitted and the valve being shown in fully closed position. The principal distinction between this valve and that shown in Fig. 1 resides in a delayed action that improves the snap action of the valve. In Fig. 1, the valve disk 17 moves concurrently with the plate 15 when raised by the diaphragm 14, but in this modification, a preliminary movement of the diaphragm occurs before the valve disk opens, thus enabling a slight build-up in the pressure beneath the diaphragm before the relieving point is reached and a corresponding faster opening movement of the valve disk.

Specifically, the numeral 60 designates the threaded end of a discharge passage 22 in Fig. 1. Also, as in the latter figure, a concentrically related seat 61 and ring 62 are provided on the upper, shouldered end of a bushing 63 that is threaded in the inlet end of the passage 60. Normally engaging the seat 61 is a valve disk 64 having on its under side an annular groove 65 which registers with an annular depression 66 between the seat 61 and ring 62. So far as described, the construction and its purpose are identical with the arrangement shown in Fig. 1.

The disk 64 carries an upwardly extending, hollow connector 67 on which is threaded a nut 68 which is coaxial with the bushing 63 and which clamps the inner portion of a diaphragm 69 against the disk. The diaphragm is preferably shaped like that shown in Fig. 1. A spring plate 70 encircles the reduced portion 71 of the nut 68 and is pressed against the upper side of the diaphragm by the lower end of a helical spring 72 whose upper end may be loaded as shown in Fig. 1. The diaphragm is not directly connected to the plate 70 and the latter may move freely relative to and lengthwise of the nut 68 between the lower position shown in Fig. 3 in which it clamps the diaphragm 69 against the disk 64 and an upper position in which it engages a shoulder 73 on the nut (see Fig. 4). Manual raising of the disk 64 is effected by a stem 73a whose upper end may be actuated as in Fig. 1 and whose lower end carries a head 74 that engages an interior shoulder 75 in the nut.

Siphonic action is prevented by a ball valve 76 which engages a valve seat 77 provided in a passage 78 that extends through the connector 67, the valve being urged by a spring 79 that is supported by a split, spring ring 80 positioned in an appropriate groove in the wall of the passage 78. The upper end of the passage 78 communicates with a chamber 81 in the nut 68 between the head 74 and the upper end of the connector 67 and the chamber 81 communicates through lateral passages 82 in the nut with the interior of the valve cover, such as the cover 13, which is at atmospheric pressure for reasons explained in connection with Fig. 1. The head 74 is maintained in contact with the shoulder 75 and clear of the upper end of the passage 78 by means of a spring 83 which rests on the annular shoulder 84 on which the seat 77 is formed.

So long as the boiler pressure remains below that set for the valve to open, the valve disk 64 is forced into contact with the seat 61 by the spring 72 as shown in Fig. 3. As the boiler pressure rises, the diaphragm 69 moves upwardly to thereby impart a like movement to the spring plate 70 against the spring 72. This movement of the diaphragm is not accompanied by a movement of the disk 64 since the diaphragm outwardly of the nut 68 is not positively connected to the disk 64 and the plate 70. Therefore, as the diaphragm continues to rise, a part thereof which had been in contact with the upper surface of the disk 64 raises to expose a substantial portion of this surface to the boiler pressure which acts to maintain the seating of the disk. This condition continues until the plate 70 engages the shoulder 73 on the nut 68, after which further movement of the diaphragm causes a quick opening movement of the disk 64 and the action thereafter, including the prevention of siphonage, is the same as that described for Fig. 1. Specifically, and referring to Fig. 4 which represents an intermediate position of the valve, i. e., one in which the upward movement of the diaphragm 69 has shifted the spring plate 70 into contact with the shoulder 73 and away from the valve disk 64 which then engages the valve seat 61, it will be observed that the valve disk 64 is then free of restraint by the spring 72. Hence, when the valve disk 64 is lifted clear of the valve seat 61 by a further upward movement of the spring plate 70 and diaphragm 69 due to an additional rise in pressure beneath the latter, the valve disk 64 is free to move upward with a snap action due to the throttled pressure operating between the seat 61 and ring 62 and unimpeded by the spring 72 until it engages the spring plate 70.

When the boiler pressure falls below the pressure at which the valve relieves, the valve then being in an open position, the capacity of the disk 64 for movement relative to the plate 70 and the major portion of the diaphragm 69, in conjunction with the partial vacuum existing in the discharge passage 60 at this time, enables the disk 64 to move tightly against the valve seat 61 slightly in advance of the extending action of the spring 72. This operation is facilitated by the partial separation of the diaphragm 69 from contact with the upper surface of the disk 64, thus exposing an added portion of this disk to the closing action of the boiler pressure, as shown in Fig. 4.

The above floating spring action also has value in a valve equipped only with the spring seat 61, i. e., without the choking ring 62 and therefore a valve that is not characterized by snap action.

Figure 6:
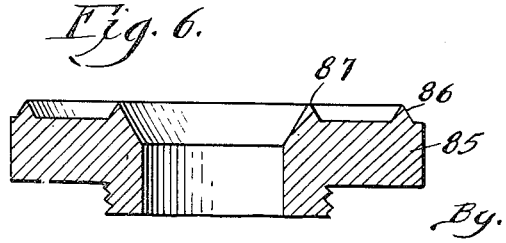
Fig. 6 shows a variant valve seat arrangement.

In Fig. 6 is illustrated a variant arrangement of the sealing rings or shoulders which may be applied to the bushings 21 or 63. The comparable bushing is designated by the numeral 85 and its flanged end is provided with concentric, outer and inner sealing rings 86 and 87, respectively, having the same height and corresponding, respectively, to the ring 19 and shoulder 20, and the ring 61 and shoulder 62. If desired, the rings 86 and 87 may be formed on the disks 17 or 64.

I claim:

1. A pressure relief valve comprising an inlet and an outlet having a valve seat, a valve disk operably related to the seat, a clamping part secured to the disk, a diaphragm disposed transversely of the valve disk and having its central portion secured between the part and disk and responsive on the disk side to inlet pressure, a spring plate on the opposite side of the diaphragm encircling and shiftable relative to the part, spring means normally urging the plate to press the diaphragm against the disk and the disk against the seat and the diaphragm being responsive to a predetermined inlet pressure to move the plate away from and relieve the disk of spring means pressure, the part having a shoulder spaced from the disk and engageable by and after a substantial movement of the plate away from the disk to thereby separate the disk from the seat, and means located between the seat and outlet and operably related to the disk when the latter is moved away from the seat to retard the release of the inlet pressure sufficiently to make such pressure effective against the seat side of the disk which is then further moved in an opening direction with a snap action.

2. A pressure relief valve comprising an inlet and an outlet, a member having a pair of concentric ridges surrounding the outlet, the outer ridge forming a valve seat, a valve disk operably related to the seat, a clamping part secured to the disk, a diaphragm disposed transversely of the valve disk and having its central portion secured between the part and disk and responsive on the disk side to inlet pressure, a spring plate on the opposite side of the diaphragm encircling and shiftable relative to the part, spring means normally urging the plate to press the diaphragm against the disk and the disk against the seat and the diaphragm being responsive to a predetermined inlet pressure to move the plate away from and relieve the disk of spring means pressure, the part having a shoulder spaced from the disk and engageable by and after a substantial movement of the plate away from the disk to thereby separate the disk from the seat and the inner ridge being operably related to the disk when the latter is moved away from the seat to retard the release of the inlet pressure sufficiently to make such pressure effective against the seat side of the disk which is then further moved in an opening direction with a snap action.

3. A pressure relief valve comprising an inlet and outlet, a pair of cooperating members operably related to the outlet, one member constituting a valve disk and the other member a valve seat, a diaphragm responsive on one side to inlet pressure and having a limited central portion thereof secured to the one member, a shiftable spring plate on the opposite side of the diaphragm, spring means normally urging the plate to press the diaphragm against the one member and the one member against the other member, a part coaxial with and extending from the one member through the diaphragm and plate and having a shoulder spaced from the one member, the diaphragm being responsive to a predetermined inlet pressure to move the plate away from and relieve the one member of spring means pressure and the plate after a substantial movement away from the one member engaging the shoulder to thereby separate the one member from the other member, and means carried by one of the members between the engaging portions of both members and the outlet and operably related to the one member when the latter is moved away from the other member to retard the release of the inlet pressure sufficiently to make such pressure effective against the one member which is then further moved in an opening direction with a snap action.

4. A pressure relief valve comprising an inlet and an outlet having a valve seat, a valve operably related to the seat, a diaphragm responsive on one side to inlet pressure and having a limited part of its central portion secured to the valve, the opposite side of the diaphragm being exposed to atmospheric pressure, a shiftable spring plate on said opposite side of the diaphragm, spring means normally urging the plate to press the diaphragm against the valve and the valve against the seat, a part coaxial with and extending from the valve through the diaphragm and plate and having a shoulder spaced from the valve, the diaphragm being responsive to a predetermined inlet pressure to move the plate away from and relieve the valve of spring means pressure and the plate after a substantial movement away from the valve engaging the shoulder to thereby separate the valve from the seat, means located between the seat and outlet and operably related to the valve when the latter is moved away from the seat to retard the release of the inlet pressure sufficiently to make such pressure effective against the seat side of the valve which is then further moved in an opening direction with a snap action, and means for admitting atmospheric air to the outlet to break any partial vacuum that may be created by liquid flowing through the outlet comprising a passage through the valve providing communication between the outlet and the atmospheric side of the diaphragm and spring actuated valve means normally closing the passage and opening towards the outlet to admit atmospheric air thereto when a condition of partial vacuum obtains in the outlet.

5. A pressure relief valve comprising an inlet and an outlet, a pair of cooperating members operably related to the outlet, one member constituting a valve disk and the other member a valve seat, spring actuated diaphragm means normally urging the one member into engagement with the other member and responsive on the one member side of the diaphragm means to inlet pressure, a shoulder carried by and spaced axially from the one member, the diaphragm means being responsive to a predetermined inlet pressure for movement away from and relieving the one member of spring pressure and after a substantial movement away from the one member engaging the shoulder to thereby separate the one member from the other member, and means carried by one of the members between the engaging portions of both members and the outlet and operably related to the one member when the latter is moved away from the other member to retard the release of the inlet pressure sufficiently to make such pressure effective against the one member which is then further moved in an opening direction with a snap action.

HENRY P. BIRKEMEIER.

REFERENCES CITED

The following references are of record in the file of this patent:

UNITED STATES PATENTS

| Number | Name | Date |
|---|---|---|
| 112,183 | Reynolds | Feb. 28, 1871 |
| 123,546 | Ashton | Feb. 13, 1872 |
| 911,379 | Collins | Feb. 2, 1909 |
| 1,008,816 | Hamilton | Nov. 14, 1911 |
| 1,163,236 | Holzer | Dec. 7, 1915 |
| 1,210,913 | Doughtery | Jan. 2, 1917 |
| 1,312,695 | Kessler | Aug. 12, 1919 |
| 1,783,646 | Hajek | Dec. 2, 1930 |
| 1,964,616 | Willson | June 26, 1934 |
| 2,074,292 | Wilkins | Mar. 16, 1937 |
| 2,134,803 | Rose | Nov. 1, 1938 |
| 2,181,969 | Eshbaugh | Dec. 5, 1939 |
| 2,286,713 | Burks | June 16, 1946 |
| 2,431,457 | Bondurant | Nov. 25, 1947 |

FOREIGN PATENTS

| Number | Country | Date |
|---|---|---|
| 99,908 | Sweden | of 1940 |